(No Model.)
C. W. HUNT.
CAR TRUCK.
No. 256,571. Patented Apr. 18, 1882.
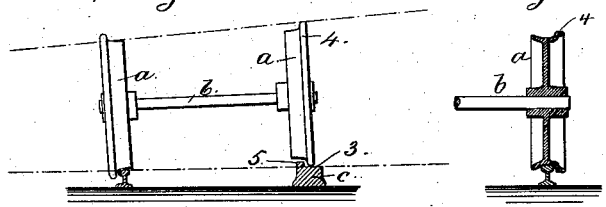
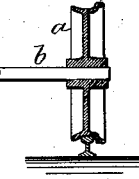
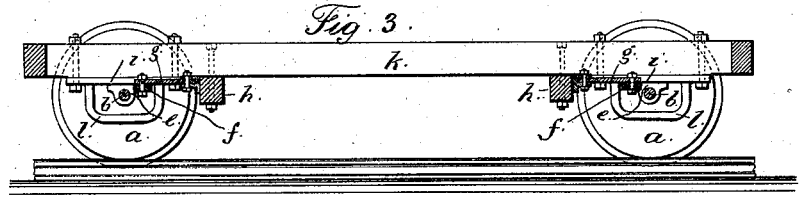
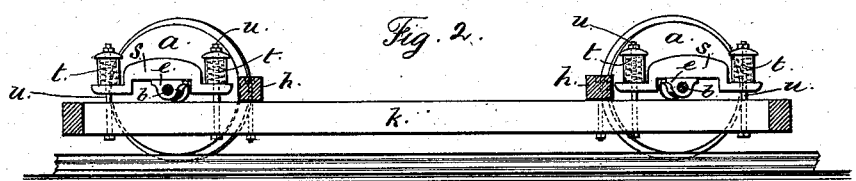
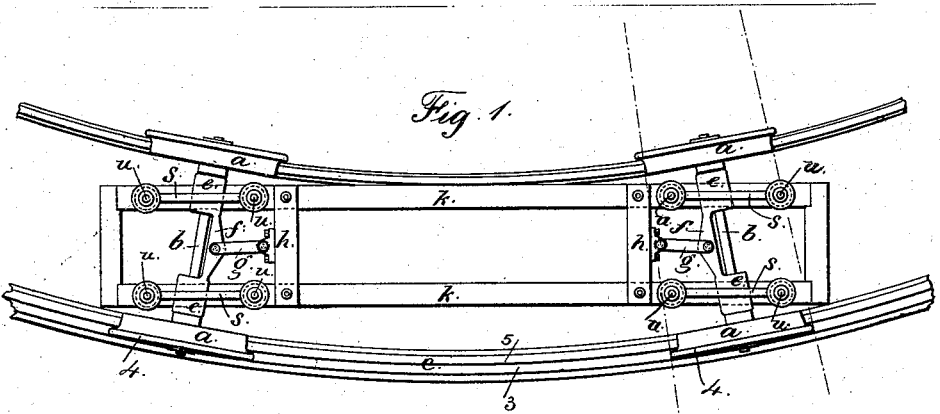
Witnesses
Chas H Smith
Harold Serrell
Inventor
Charles W. Hunt
per Lemuel W. Serrell
atty

UNITED STATES PATENT OFFICE.

CHARLES W. HUNT, OF WEST BRIGHTON, NEW YORK.

CAR-TRUCK.

SPECIFICATION forming part of Letters Patent No. 256,571, dated April 18, 1882.

Application filed January 3, 1882. (No model.)

*To all whom it may concern:*

Be it known that I, CHARLES W. HUNT, of West Brighton, in the county of Richmond and State of New York, have invented an Improvement in Car-Trucks, of which the following is a specification.

Car-trucks have been made to swing upon a pivot, so that the axle of each pair of wheels will occupy a radial position, or nearly so, to the curved track. The present device is especially adapted to coal and freight cars in which a single axle with a pair of wheels is placed under the car near each end. I make use of axle-boxes that are connected together and to a link near the middle, so that the axles can turn into an inclined position to the longitudinal center of the car and occupy a radial or nearly radial position in turning curves, and the flanges of the wheels are placed upon the outside edge of the wheel and the rails laid with reference to this character of wheel, so that in running a curve the outer wheel will run upon the flange and form with the other wheel a conical rolling-surface that will describe the curve of the track.

In the drawings, Figure 1 is a plan view of the truck upon a curved track. Fig. 2 is a side view of the improvement applied to a car-frame, in which the side bearer is above the axle. Fig. 3 is a similar view with the side bearer below the axle; and Fig. 4 is a cross-section of the track, showing the wheels as in a position for running upon a curved track. Fig. 5 is a section of the car-wheel.

The wheels $a\ a$ are upon the axle $b$, and the flanges are upon the outer edges of the wheels, instead of being upon the inner edges, as usual, and the rails are of ordinary character, except where the track is curved, at which place the outer rail, $c$, is provided with a flat bearing-surface, 3, outside of the top 5 of the rail, as shown in Fig. 4, in order that the flange 4 of the outer wheel may run upon this flat portion; and said flange, being of larger diameter than the cylindrical portion of the wheel itself, will travel over the outer and longer rail of the track while the other wheel rolls over the inner rail of the curved track. Thus the two wheels form a conoidal rolling-surface.

I am aware that in turning curves it is usual in city-cars for the outer wheel to run upon the flange; but the centrifugal action brought all the lateral strain upon the edge of the flange. By my improvement the flange of the wheel that is outside the inner curved rail takes the lateral strain caused by the centrifugal action in running around a curve. Hence the flange of the outer wheel is not liable to be broken or chipped at its edge.

The bearings $e\ e$ for the axle $b$ are connected together by the bar $f$, and to this bar $f$ one end of the link $g$ is hinged, the other end of the link being hinged to the cross-piece $h$ of the car-frame $k$. When the side bearers, $k$, of the car-frame are above the journals, as in Fig. 3, the bearings or journal-boxes $e$ will be flat upon their upper surfaces and rest against a plate, $i$, upon the under side of the side bearers. The journal-boxes $e$ are kept in position by the loops or straps $l$ passing below said boxes $e$; but there is sufficient distance between the loops and the boxes for the boxes to slide as the shaft assumes a position in line with the radius in turning curves, as seen in Fig. 1. Where the side bearers, $k$, are below the axles the journal-boxes will be below a spring-bar, $s$, the ends of which are below the rubber or other springs $t$, there being bolts $u$ passing through the side bearers, $k$, and through the springs, as represented.

The wheels are by preference made in the manner represented in larger size in Fig. 5, so that the treads of the wheels will be slightly conical inwardly, although the flange remains on the outer edge of the tread. This form insures the proper running of the wheels over the straight track and prevents the axle remaining in an inclined position.

I claim as my invention—

The combination, with the pairs of wheels and axles, the former having outside flanges, of the journal-boxes $e$, the bars $f$, connecting such journals in pairs, the links $g$, pivoted to the frame and bars $f$, respectively, the bearers $i$ or $s$, and the side frames of the car, substantially as set forth.

Signed by me this 29th day of December, A. D. 1881.

C. W. HUNT.

Witnesses:
GEO. T. PINCKNEY,
WILLIAM G. MOTT.